(12) United States Patent
Ishihara

(10) Patent No.: US 9,186,606 B2
(45) Date of Patent: Nov. 17, 2015

(54) MACHINE TOOL WITH CUTTING FLUID FILTRATION DEVICE

(71) Applicant: FANUC CORPORATION, Minamitsuru-gun, Yamanashi (JP)

(72) Inventor: Mitsuyoshi Ishihara, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 148 days.

(21) Appl. No.: 14/069,799

(22) Filed: Nov. 1, 2013

(65) Prior Publication Data

US 2014/0124418 A1 May 8, 2014

(30) Foreign Application Priority Data

Nov. 2, 2012 (JP) ................................. 2012-243068
Nov. 16, 2012 (JP) ................................. 2012-252459

(51) Int. Cl.
*B01D 29/60* (2006.01)
*B01D 35/02* (2006.01)
*B01D 29/66* (2006.01)
*B23Q 11/10* (2006.01)

(52) U.S. Cl.
CPC .............. *B01D 29/605* (2013.01); *B01D 29/66* (2013.01); *B01D 35/02* (2013.01); *B23Q 11/1069* (2013.01)

(58) Field of Classification Search
None
See application file for complete search history.

(56) References Cited

U.S. PATENT DOCUMENTS 5,772,900 A * 6/1998 Yorita et al. .................. 210/805

FOREIGN PATENT DOCUMENTS

| CN | 1170622 A | 1/1998 |
|---|---|---|
| CN | 101549466 A | 10/2009 |
| CN | 201833226 U | 5/2011 |
| JP | 3151009 A | 6/1991 |
| JP | 2000-061774 A | 2/2000 |
| JP | 2001-252847 A | 9/2001 |
| JP | 2004-066425 A | 3/2004 |
| JP | 2005118696 A | 5/2005 |
| JP | 2006-255833 A | 9/2006 |
| JP | 2006-272474 A | 10/2006 |
| JP | 2010234471 A | 10/2010 |

OTHER PUBLICATIONS

Office Action mailed Apr. 8, 2014, corresponds to Japanese patent application No. 2012-252459.
Office Action mailed May 12, 2015, corresponding to Chinese patent application No. 201310533774.6.

* cited by examiner

*Primary Examiner* — Terry Cecil
(74) *Attorney, Agent, or Firm* — Hauptman Ham, LLP

(57) ABSTRACT

A cutting fluid filtration device attached to a machine tool has the function of backwashing a filter for filtering impurities in a cutting fluid when the filter is clogged. Whether or not the filter is clogged is determined by integrating the time during which the liquid level of the cutting fluid in a clean fluid tank falls below a lower-limit position by means of a sensor configured to detect the height of the liquid level of the cutting fluid. When a preset reference value is exceeded by the resulting integrated value, it is determined that the filter is clogged.

9 Claims, 15 Drawing Sheets

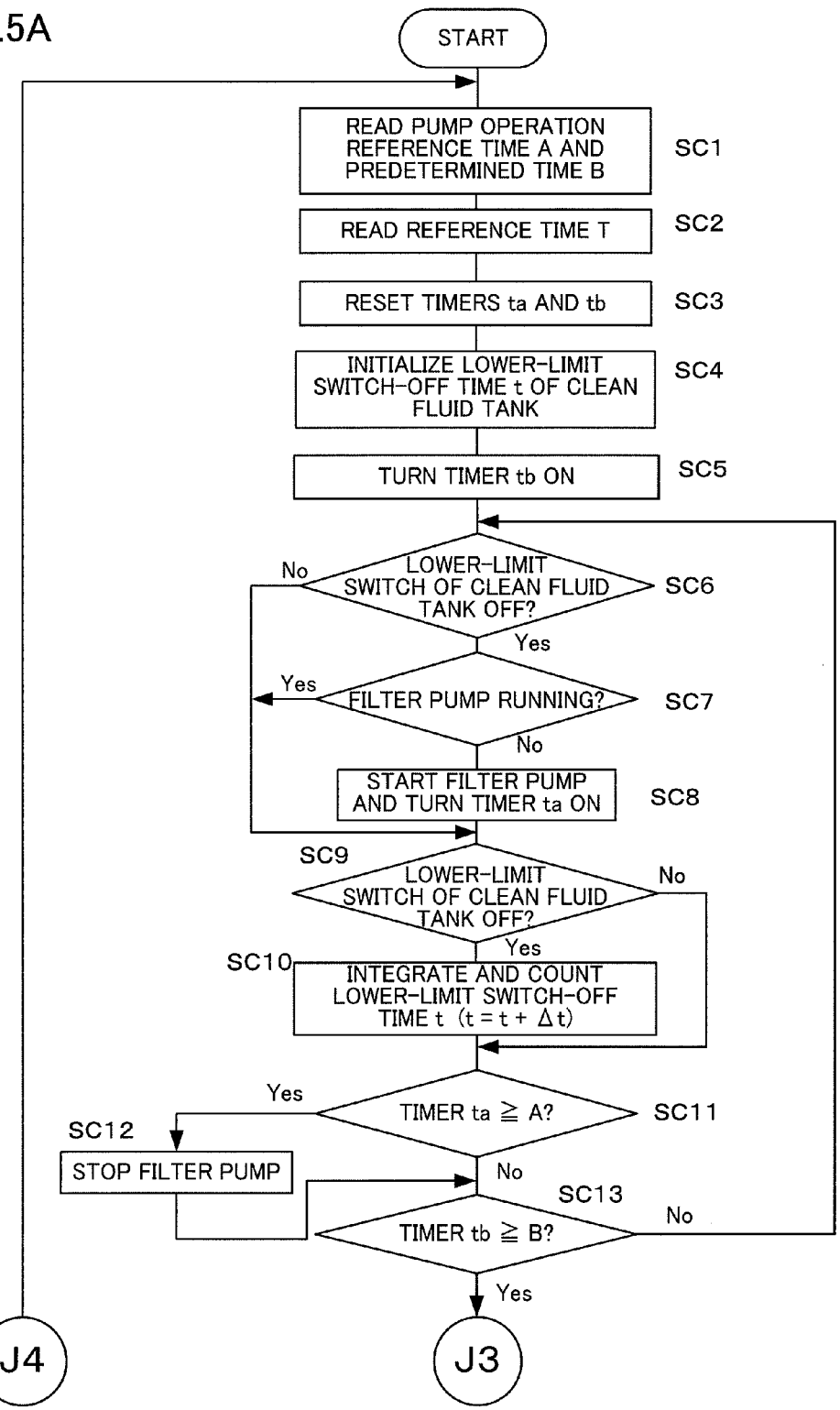

MACHINE TOOL WITH CUTTING FLUID FILTRATION DEVICE

RELATED APPLICATIONS

The present application is based on and claims priority to Japanese Application Number 2012-243068, filed Nov. 2, 2012, and Japanese Application Number 2012-252459, filed Nov. 16, 2012, the disclosures of which are hereby incorporated by reference herein in their entirety.

BACKGROUND OF THE INVENTION

1. Field of the Invention

The present invention relates to a machine tool with a cutting fluid filtration device, and more particularly, to a machine tool provided with a cutting fluid filtration device which has function of cleaning a filter used to remove chips and sludge mixed in a cutting fluid and capable of accurately detecting clogging of the filter at low cost.

2. Description of the Related Art

A cutting fluid filtration device used in a machine tool is provided with a filter configured to remove impurities, such as chips and sludge, which are produced during machining and mixed in a cutting fluid, thereby adversely affecting the performance and reliability of the machine tool. This filter is cleaned in order to maintain its decontamination performance and extend its life. In cleaning the filter, the cutting fluid sometimes may be passed in the direction opposite to its flowing direction for normal use so that backwashing can be performed to remove chips and sludge adhering to the filter. Cutting fluid filtration devices having the function of performing filter cleaning based on such backwashing are disclosed in Japanese Patent Applications Laid-Open Nos. 2006-272474, 2006-255833 and 2001-252847.

The following is a description of an outline of the backwashing operation disclosed in the above-described patent documents.

First, the backwashing filter and inflow- and outflow-side ducts of a filter container are closed so that the cutting fluid remaining in the filter and the filter container can not flow out. Then, compressed air is introduced into the filter container in the direction opposite to the direction of normal flow of the cutting fluid, and a discharge valve in a discharge duct in the filter container is opened. Thereupon, the cutting fluid pressurized by the compressed air flows in the opened discharge duct after passing through the filter. Impurities, such as chips and sludge, adhering to the filter are removed by means of this flow of the cutting fluid.

A prior art example of the cutting fluid filtration device having the filter cleaning function to remove chips and sludge adhering to the filter by backwashing (disclosed in the above-described patent documents) will be described with reference to FIG. 13.

A cutting fluid filtration device 1 is controlled by a controller (not shown). The controller actuates the filtration device 1, and drives a filter pump 11 to draw up a cutting fluid 19 containing chips through a duct 20 and introduce the cutting fluid filtered by a filter into a machine tool body 70 through a filter container 13. The filter (not shown) for removing the chips from the cutting fluid is attached to the inside of the filter container 13.

As the cutting fluid 19 containing chips and stored in a tank 10 continues to be decontaminated, the amount of chips adhering to the filter in the filter container 13 gradually increases. A differential pressure between inflow- and outflow-side ducts 21 and 22 of the filter is detected by a differential-pressure switch 14, and backwashing is started when a predetermined value is exceeded by the detected differential pressure.

In the backwashing operation, the drive of the filter pump 11 is first stopped so that the drawing of the cutting fluid 19 containing chips from the tank 10 is interrupted. In this state, the inflow- and outflow-side ducts 21 and 22 of the filter container 13 are closed by an inflow valve 12 and an outflow valve 18, respectively. Thereupon, the cutting fluid remaining in the filter container 13 cannot flow out into the tank 10 and the machine tool body 70.

Subsequently, an air supply valve 17 connected to an air source 16 is opened, and compressed air is introduced into the filter container 13 in the direction opposite to the direction of normal flow of the cutting fluid. Then, the air supply valve 17 connected to the air source 16 is closed, and a discharge valve 15 connected to the filter container 13 is opened. In this state, the cutting fluid pressurized by the compressed air passes through the filter in the filter container 13 in the direction opposite to the direction of normal flow of the cutting fluid, and then returns to the tank 10 through the discharge valve 15 in a duct 23. Chips and sludge adhering to the filter are removed by means of this flow of the cutting fluid. Further, the differential-pressure switch 14 may be replaced with a pressure sensor or flow sensor.

In the backwashing operation of FIG. 13 disclosed in the foregoing patent documents, whether or not to perform the backwashing is determined by a measured value obtained by the differential-pressure switch 14 (or pressure sensor). Since the switch or sensor of this type is expensive, however, this operation leaves a room for improvement in cost. This also applies to the case where a flow sensor is used.

Japanese Patent Application Laid-Open No. 2000-61774 discloses a technique in which filter clogging is detected by detecting the change of electric current of a pump for supplying a cutting fluid to a filter. The electric current change of the pump used in this detection technique is such that the electric current value also changes depending on the variation of the viscosity of the cutting fluid and the degree of degradation of the pump. It is difficult, therefore, to accurately detect the filter clogging with a change of the electric current value attributable to clogging distinguished from that caused by some other factor than clogging.

Further, Japanese Patent Application Laid-Open No. 2004-66425 discloses a technique in which the time of cutting fluid supply to a clean fluid tank is measured so that an abnormality can be identified and the timing of filter replacement and the like can be informed when a predetermined preset time is exceeded by the time required for the supply. According to this technique, an abnormality is identified by the cutting fluid supply time. If the detection is performed during machining operation of the machine tool using a large amount of cutting fluid, however, accurate abnormality identification sometimes cannot be achieved due to reduction of the cutting fluid in the clean fluid tank used during the machining.

SUMMARY OF THE INVENTION

The object of the present invention is to provide a machine tool with a cutting fluid filtration device for filtering a cutting fluid supplied to a machine tool body, the cutting fluid filtration device having the function of cleaning a filter used to remove chips and sludge mixed in the cutting fluid and capable of accurately detecting clogging of the filter at low cost.

In a machine tool with a cutting fluid filtration device according to the present invention, the cutting fluid filtration device comprises a contaminated fluid tank which stores a cutting fluid that has been used in machining a workpiece, a pump which supplies the cutting fluid in the contaminated fluid tank to a filter configured to filter impurities contained in the cutting fluid, a clean fluid tank which stores the cutting fluid filtered by the filter, a lower-limit-position liquid level detector configured to detect a liquid level which requires supply of the cutting fluid from the contaminated fluid tank to the clean fluid tank, a pump control unit configured to drive the pump when the lower-limit-position liquid level detector detects that the liquid level of the cutting fluid is lowered below a preset lower-limit position, and a clogging determination unit configured to determine that the filter is clogged, based on a value indicative of a relationship between the lower-limit position and the liquid level detected by the lower-limit-position liquid level detector. The filter is cleaned when determined to be clogged by the clogging determination unit.

The cutting fluid filtration device may further comprise a time integration unit configured to integrate the time during which the liquid level of the cutting fluid is below the lower-limit position, and the clogging determination unit may be configured to determine that the filter is clogged when a preset reference time is exceeded by the time integrated by the time integration unit.

The clogging determination unit may be configured to determine that the filter is clogged when the preset reference time is exceeded by the time integrated by the time integration unit within a preset predetermined time.

The cutting fluid filtration device may further comprise a counter configured to count the frequency at which the liquid level of the cutting fluid rises, after falling below the lower-limit position, and then reaches the lower-limit position, and the clogging determination unit may be configured to determine that the filter is clogged if the frequency counted by the counter is lower than a preset reference frequency within a preset predetermined time.

The cutting fluid filtration device may further comprise an upper-limit-position liquid level detector configured to detect an upper-limit position of the liquid level of the cutting fluid in the clean fluid tank, and the pump control unit may be configured to drive the pump when the liquid level of the cutting fluid falls below the lower-limit position and to stop the pump when the liquid level reaches the upper-limit position.

The pump control unit may be configured to drive the pump when the liquid level of the cutting fluid in the clean fluid tank falls below the lower-limit position and to stop the pump when a preset pump operation reference time has elapsed.

The machine tool may be stopped when it is determined by the clogging determination unit that the filter is clogged.

The machine tool may comprise informing means for informing that the filter is clogged if it is determined by the clogging determination unit that the filter is clogged.

The reference time, the predetermined time, the reference frequency, and the pump operation reference time may be individually variable.

According to the present invention, there can be provided a machine tool with a cutting fluid filtration device for filtering a cutting fluid supplied to a machine tool body, the cutting fluid filtration device having the function of cleaning a filter used to remove chips and sludge mixed in the cutting fluid and capable of accurately detecting clogging of the filter at low cost.

BRIEF DESCRIPTION OF THE DRAWINGS

The above and other objects and features of the present invention will be obvious from the ensuing description of embodiments with reference to the accompanying drawings, in which:

FIGS. 5A and 5B are flowcharts illustrating a method of determining clogging of a filter by the cutting fluid filtration device according to the third embodiment;

DETAILED DESCRIPTION OF THE PREFERRED EMBODIMENTS

First Embodiment

Figure 1:
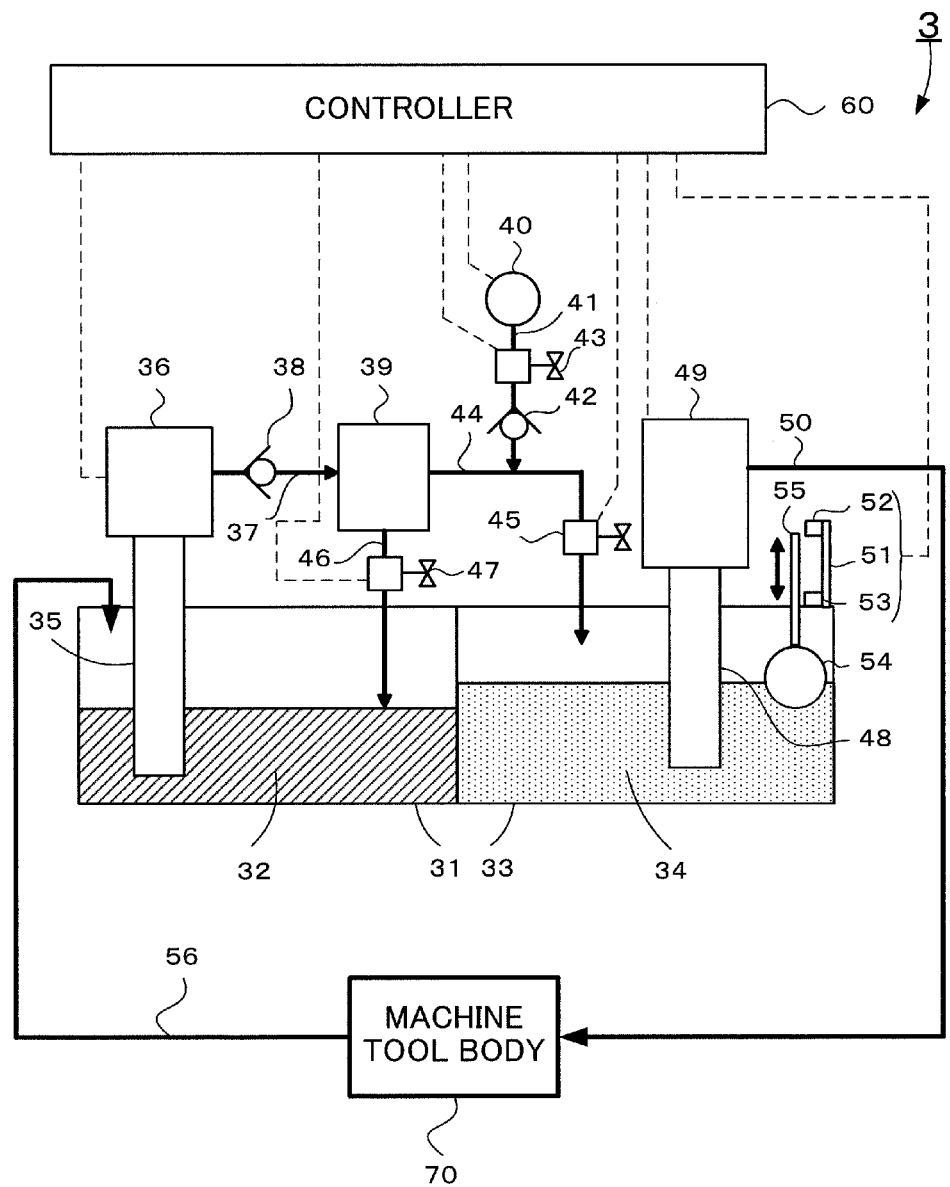
FIG. 1 is a diagram illustrating a cutting fluid filtration device according to a first, second, or fourth embodiment of the present invention.

A cutting fluid filtration device according to a first embodiment of the present invention will be described with reference to FIG. 1.

A cutting fluid filtration device 3 comprises a contaminated fluid tank 31, clean fluid tank 33, filter pump 36, filter container 39, air source 40, and controller 60. A cutting fluid 32 containing chips is accommodated in the contaminated fluid tank 31, and a decontaminated cutting fluid 34 is accommodated in the clean fluid tank 33. The filter container 39 is fitted therein with a filter (not shown) configured to remove impurities from a cutting fluid containing impurities. The controller 60 generally controls the cutting fluid filtration device 3.

A machine tool body 70 machines a workpiece (not shown) under the control of a numerical controller (not shown).

A pump 49 is controlled by the controller 60 and supplies the filtered cutting fluid 34 in the clean fluid tank 33 to the machine tool body 70 through a duct 50. The used cutting fluid discharged from the machine tool body 70 is collected into the contaminated fluid tank 31 through a duct 56. The rate and amount of supply of the filtered cutting fluid 34 from the clean fluid tank 33 to the machine tool body 70 vary depending on the type of the workpiece to be machined and the machining degree.

The controller 60 performs driving control of the filter pump 36 and the air source 40 and on-off control of an air supply valve 43, outflow valve 45, and discharge valve 47, receives detection signals output from an upper-limit detection proximity sensor 52 and a lower-limit detection proximity sensor 53, and acquires information on the liquid level of the filtered cutting fluid in the clean fluid tank 33.

Filtration of the cutting fluid containing impurities by the cutting fluid filtration device 3 will be described first.

The cutting fluid collected from the machine tool body 70 is stored in the contaminated fluid tank 31. Impurities, such as chips and sludge, are mixed in the cutting fluid collected from the machine tool body 70. The impurities stored in the contaminated fluid tank 31 is drawn up by the filter pump 36 and delivered to the filter container 39 through a duct 37 and a check valve 38. The filter container 39 is fitted therein with the filter (not shown) configured to remove the impurities from the cutting fluid.

The filter container 39 comprises an inlet (not shown) through which the cutting fluid 32 containing impurities from the filter pump 36 flows in, an outlet (not shown) through which the filtered cutting fluid flows out into the clean fluid tank 33, and the discharge valve 47 through which the cutting fluid is discharged into the contaminated fluid tank 31.

In filtering the cutting fluid containing impurities, the controller 60 controls the outflow valve 45 and the discharge valve 47 to open and close, respectively. The check valve 38 is located at some midpoint of the duct 37 that connects the filter pump 36 and the filter container 39. The check valve 38 serves to prevent the cutting fluid and compressed air (described later) from flowing back from the side of the filter container 39 toward the filter pump 36.

The outflow valve 45 is located at some midpoint of a duct 44 that is connected to the outlet of the filter container 39. Further, the air source 40 is connected between the outflow valve 45 and the outlet of the filter container 39 by a duct 41. The duct 41 is provided with a check valve 42 and the air supply valve 43. The check valve 42 serves to prevent compressed air and the cutting fluid from flowing back toward the air source 40. The air supply valve 43 serves to introduce compressed air into the duct 41 during backwashing. The air supply valve 43 is kept closed when the filter pump 36 is driven to filter the cutting fluid containing impurities.

The cutting fluid containing impurities such as chips and sludge is introduced into the filter in the filter container 39 by the filter pump 36 disposed in the contaminated fluid tank 31. After the impurities are removed by the filter, the cutting fluid is discharged into the clean fluid tank 33. The clean fluid tank 33 is provided with two proximity sensors, the upper- and lower-limit detection proximity sensors 52 and 53, configured to detect the liquid level of the cutting fluid. The proximity sensors 52 and 53 are attached to a sensor support 51, individually at predetermined portions thereof, fixed to the clean fluid tank 33, and serve to detect upper- and lower-limit liquid levels, respectively.

A float 54 floats on the filtered cutting fluid 34 in the clean fluid tank 33, and a liquid-level detection rod 55 is attached to the float 54. Conventional sensors, e.g., optical, magnetic, or electrical, can be used for the proximity sensors.

If the liquid level of the filtered cutting fluid 34 in the clean fluid tank 33 lowers so that the lower-limit detection proximity sensor 53 is turned off, the filter pump 36 is actuated to start discharging the filtered cutting fluid into the clean fluid tank 33. After the proximity sensor 53 is turned on, the discharge of the cutting fluid is continued until the upper-limit detection proximity sensor 52 is turned on. If the proximity sensor 52 is turned on, the filter pump 36 stops.

As described above, the cutting fluid filtration device 3 that filters the cutting fluid introduced into the machine tool body 70 uses the filter for removing impurities (chips and sludge) from the cutting fluid. To maintain the performance of this filter and extend its life, a cleaning operation is performed to remove the chips and sludge adhering to the filter. The backwashing is an example of the filter cleaning operation.

In performing the backwashing, inflow- and outflow-side ducts of the filter container 39 fitted with the filer for cleaning are individually closed by valves so that the cutting fluid remaining in the filter container 39 can not flow out. Then, the air supply valve 43 connected to the air source 40 is opened, and compressed air is introduced into the filter container 39 in the direction opposite to the direction of normal flow of the cutting fluid. Subsequently, the air supply valve 43 connected to the air source 40 is closed, and the discharge valve 47 mounted at some midpoint of a duct connected to the filter container 39 is opened. Thereupon, the cutting fluid pressurized by the compressed air passes through the filter container 39 in the direction opposite to the direction of its normal flow and then returns to the contaminated fluid tank 31 through the discharge valve 47. The impurities, including the chips and sludge, which adhere to the filter can be removed by means of this flow of the cutting fluid.

In a method of determining clogging of the filter during the backwashing, according to this embodiment, an integrated value obtained while the lower-limit detection proximity sensor 53 is off is detected. If this integrated value is greater than a preset reference time T, the filter is determined to be clogged. First, the operations of the upper- and lower-limit detection proximity sensors 52 and 53 with respect to the liquid level position will be described with reference to FIG. 6.

Figure 6:
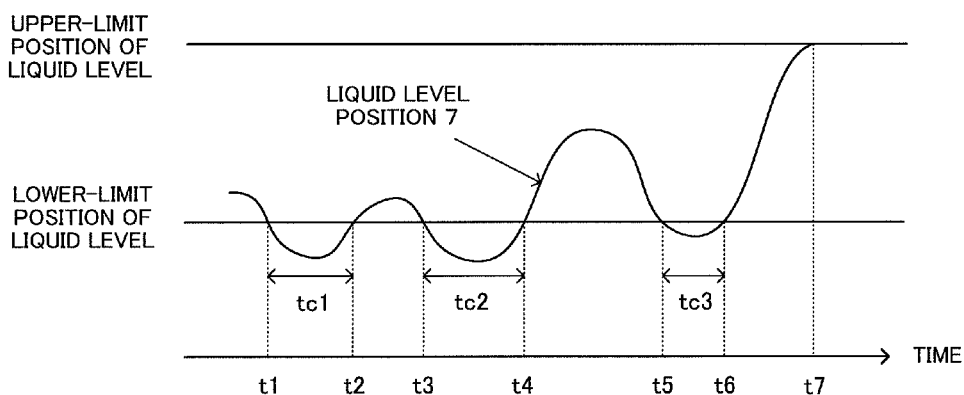
FIG. 6 is a diagram illustrating the relationship between the liquid level position and operation in the cutting fluid filtration device according to any of the first to third embodiments.

Curve 7 in FIG. 6 represents the liquid level position that varies with time.

If the liquid level lowers below a lower-limit liquid level position at time t1, the lower-limit detection proximity sensor 53 is turned off. If the liquid level rises above the lower-limit liquid level position at time t2, thereafter, the proximity sensor 53 is turned on. Thereupon, lower-limit switch-off time t is measured during period tc1 from time t1 to time t2 (t=tc1). As the liquid level lowers below its lower-limit position at time t3, thereafter, the lower-limit detection proximity sensor 53 is turned off. When the liquid level then rises above the lower-limit position again at time t4, the proximity sensor 53 is turned on. In this way, lower-limit switch-off time t is measured for period tc2 from time t3 to time t4 (t=tc1+tc2). Likewise, lower-limit switch-off time t is measured for period tc2 from time t3 to time t4 (t=tc1+tc2). Likewise, lower-limit switch-off time t is measured for period tc3 from time t5 to time t6 during which the liquid level continues to be lower than the lower-limit position (t=tc1+tc2+tc3). At time t7, the liquid level continues to rise so that the upper-limit detection proximity sensor 52 is turned on. Thereupon, the operation of the filter pump 36 is stopped, so that the supply of the cutting fluid is stopped.

Figure 3:
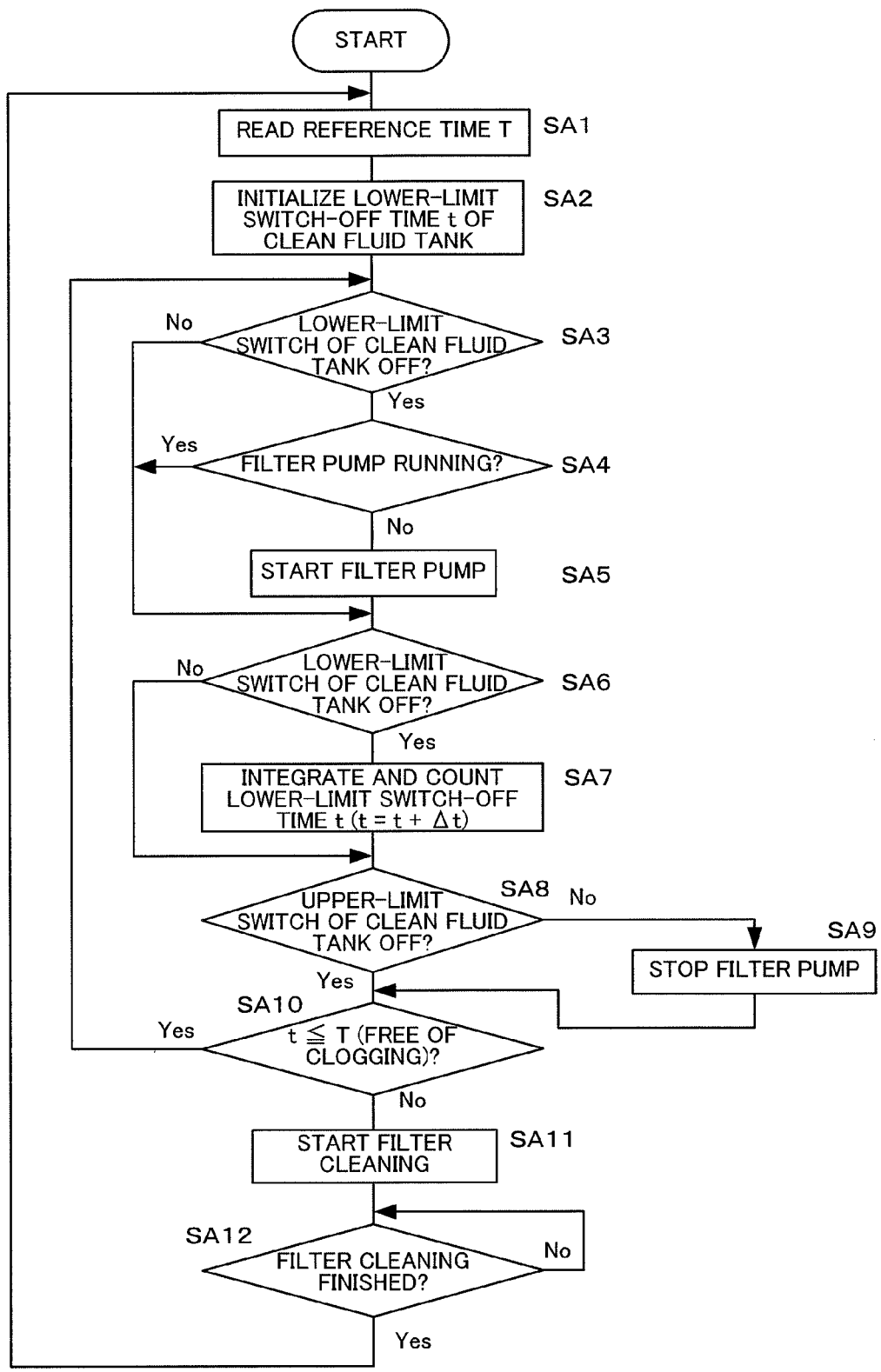
FIG. 3 is a flowchart illustrating a method of determining clogging of a filter by the cutting fluid filtration device according to the first embodiment.

FIG. 3 is a flowchart illustrating the method of determining clogging of the filter by the cutting fluid filtration device according to the first embodiment of the present invention. The following is a sequential description of various steps of operation.

(Step SA1) The preset reference time T is read.

(Step SA2) Lower-limit switch-off time t for integrating the time during which the lower-limit detection proximity sensor 53 of the clean fluid tank is off is set to "0" (or initialized).

(Step SA3) It is determined whether the lower-limit detection proximity sensor 53 of the clean fluid tank is off or not. If the proximity sensor 53 is off (Yes), that is, if the liquid level of the clean fluid tank is lower than a lower-limit value, the program proceeds to Step SA4. If the proximity sensor 53 is on (No), that is, if the liquid level of the clean fluid tank is not lower than the lower-limit value, in contrast, the program proceeds to Step SA6.

(Step SA4) It is determined whether or not the filter pump 36 is running. If the pump 36 is running, the program proceeds to Step SA6. If not (No), the program proceeds to Step SA5.

(Step SA5) The filter pump 36 is started.

(Step SA6) It is determined whether the lower-limit detection proximity sensor 53 is off or not. If the proximity sensor 53 is off (Yes), that is, if the liquid level of the clean fluid tank is lower than the lower-limit value, the program proceeds to Step SA7. If the proximity sensor 53 is on (No), that is, if the liquid level is not lower than the lower-limit value, in contrast, the program proceeds to Step SA8.

(Step SA7) Time $\Delta t$ during which the lower-limit detection proximity sensor 53 is off is added to lower-limit switch-off time t to update the lower-limit switch-off time t (t=t+$\Delta t$).

(Step SA8) It is determined whether or not the upper-limit detection proximity sensor 52 is off. If the proximity sensor 52 is off (Yes), that is, if the liquid level of the clean fluid tank is lower than an upper-limit value, the program proceeds to Step SA10. If the proximity sensor 52 is on (No), that is, if the liquid level is not lower than the upper-limit value, in contrast, the program proceeds to Step SA9.

(Step SA9) The filter pump 36 is stopped, whereupon the program proceeds to Step SA10.

(Step SA10) It is determined whether lower-limit switch-off time t for integrating the time during which the lower-limit detection proximity sensor 53 is off, which is obtained in Step SA7, is not longer than the reference time T read in Step SA1. If lower-limit switch-off time t is not longer than the reference time T (Yes), it is determined that the filter is not clogged, whereupon the program returns to Step SA3. If the reference time T is exceeded by lower-limit switch-off time t (No), in contrast, it is determined that the filter is clogged, whereupon the program proceeds to Step SA11.

(Step SA11) Filter cleaning is started.

(Step SA12) It is determined whether the filter cleaning is finished or not. If the cleaning is not yet finished (No), the process of Step SA12 is repeated until the cleaning is finished. If the cleaning is finished (Yes), it is determined that the filter cleaning is finished so that the clogging is removed, whereupon the program returns to Step SA1.

Based on the relationship between the amount of the cutting fluid supplied from the filter container 39 and that of the cutting fluid used in the machine tool body, the liquid level of the filtered cutting fluid 34 in the clean fluid tank 33 does not always monotonously rise even during cutting fluid filtration. By integrating the time during which the lower-limit detection proximity sensor 53 is off, in the first embodiment of the cutting fluid filtration device, the state of change in the liquid level can be detected more accurately and therefore clogging of the filter can be detected more accurately.

Second Embodiment

Figure 4A:
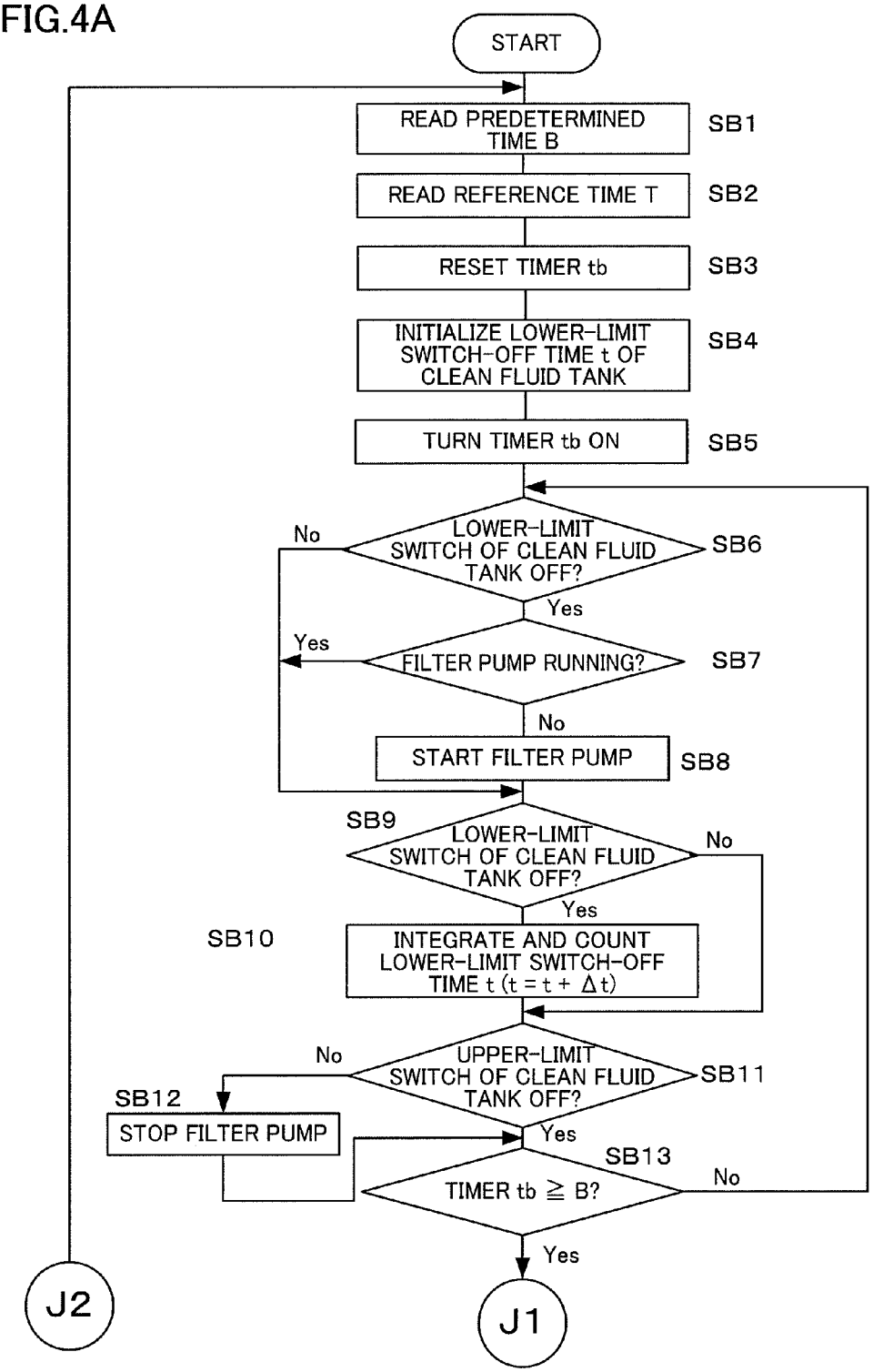
FIGS. 4A and 4B are flowcharts illustrating a method of determining clogging of a filter by the cutting fluid filtration device according to the second embodiment.

In determining clogging of a filter during backwashing, according to a second embodiment of the cutting fluid filtration device, an arbitrary predetermined time B is set, and an integrated value of the time during which a lower-limit detection proximity sensor 53 is off within the predetermined time B is detected. If this value is greater than a preset reference time T, the filter is determined to be clogged. A method of determining clogging of the filter by the cutting fluid filtration device of the second embodiment will now be described with reference to the flowcharts of FIGS. 4A and 4B. The following is a sequential description of various steps of operation.

(Step SB1) The predetermined time B is read.

(Step SB2) The preset reference time T is read.

(Step SB3) A timer tb for measuring a filter clogging determination time is reset.

(Step SB4) Lower-limit switch-off time t for integrating the time during which the lower-limit detection proximity sensor 53 of a clean fluid tank is off is set to "0" (or initialized).

(Step SB5) The timer tb for measuring the filter clogging determination time is turned on.

(Step SB6) It is determined whether the lower-limit detection proximity sensor 53 of the clean fluid tank is off or not. If the proximity sensor 53 is off (Yes), that is, if the liquid level of the clean fluid tank is lower than a lower-limit value, the program proceeds to Step SB7. If the proximity sensor 53 is on (No), that is, if the liquid level is not lower than the lower-limit value, in contrast, the program proceeds to Step SB9.

(Step SB7) It is determined whether a filter pump 36 is running or not. If the pump 36 is running (Yes), the program proceeds to Step SB9. If not (No), the program proceeds to Step SB8.

(Step SB8) The filter pump 36 is started.

(Step SB9) It is determined whether the lower-limit detection proximity sensor 53 is off or not. If the proximity sensor 53 is off (Yes), that is, if the liquid level of the clean fluid tank is lower than the lower-limit value, the program proceeds to Step SB10. If the proximity sensor 53 is on (No), that is, if the liquid level is not lower than the lower-limit value, in contrast, the program proceeds to Step SB11.

(Step SB10) Time $\Delta t$ during which the lower-limit detection proximity sensor 53 is off is added to lower-limit switch-off time t to update the lower-limit switch-off time t (t=t+$\Delta t$).

(Step SB11) It is determined whether an upper-limit detection proximity sensor 52 is off or not. If the proximity sensor 52 is off (Yes), that is, if the liquid level of the clean fluid tank is lower than an upper-limit value, the program proceeds to Step SB13. If the proximity sensor 52 is on (No), that is, if the liquid level is not lower than the upper-limit value, in contrast, the program proceeds to Step SB12.

(Step SB12) The filter pump 36 is stopped, whereupon program proceeds to Step SB13.

(Step SB13) It is determined whether or not the predetermined time B read in Step SB1 is reached by the time measured by the timer tb, that is, whether or not the time measured by the timer tb B. If the predetermined time B read in Step SB1 is reached by the time measured by the timer tb (Yes), the program proceeds to Step SB14. If not (No), the program returns to Step SB6.

(Step SB14) The timer tb is turned off.

(Step SB15) Measurement of lower-limit switch-off time t is finished.

(Step SB16) It is determined whether or not lower-limit switch-off time t for integrating the time during which the lower-limit detection proximity sensor 53 is off, which is obtained in Step SB10, is not longer than the reference time T read in Step SB2. If lower-limit switch-off time t is not longer than the reference time T (Yes), it is determined that the filter is not clogged, whereupon the program returns to Step SB1. If the reference time T is exceeded (No), it is determined that the filter is clogged, whereupon the program proceeds to Step SB17.

(Step SB17) Filter cleaning is started.

(Step SB18) It is determined whether the filter cleaning is finished or not. If the cleaning is not yet finished (No), the process of Step SB18 is repeated until the cleaning is finished. If the cleaning is finished (Yes), it is determined that the filter cleaning is finished and therefore the clogging is removed, whereupon the program returns to Step SB1.

In the second embodiment of the cutting fluid filtration device described above, as in the first embodiment, the state of change in the liquid level can be detected more accurately by integrating the lower-limit switch-off time of the clean fluid tank and therefore clogging of the filter can be detected more accurately. Further, clogging of the filter can be quickly detected by measuring the lower-limit switch-off time of the clean fluid tank within the predetermined time B.

Third Embodiment

Figure 2:
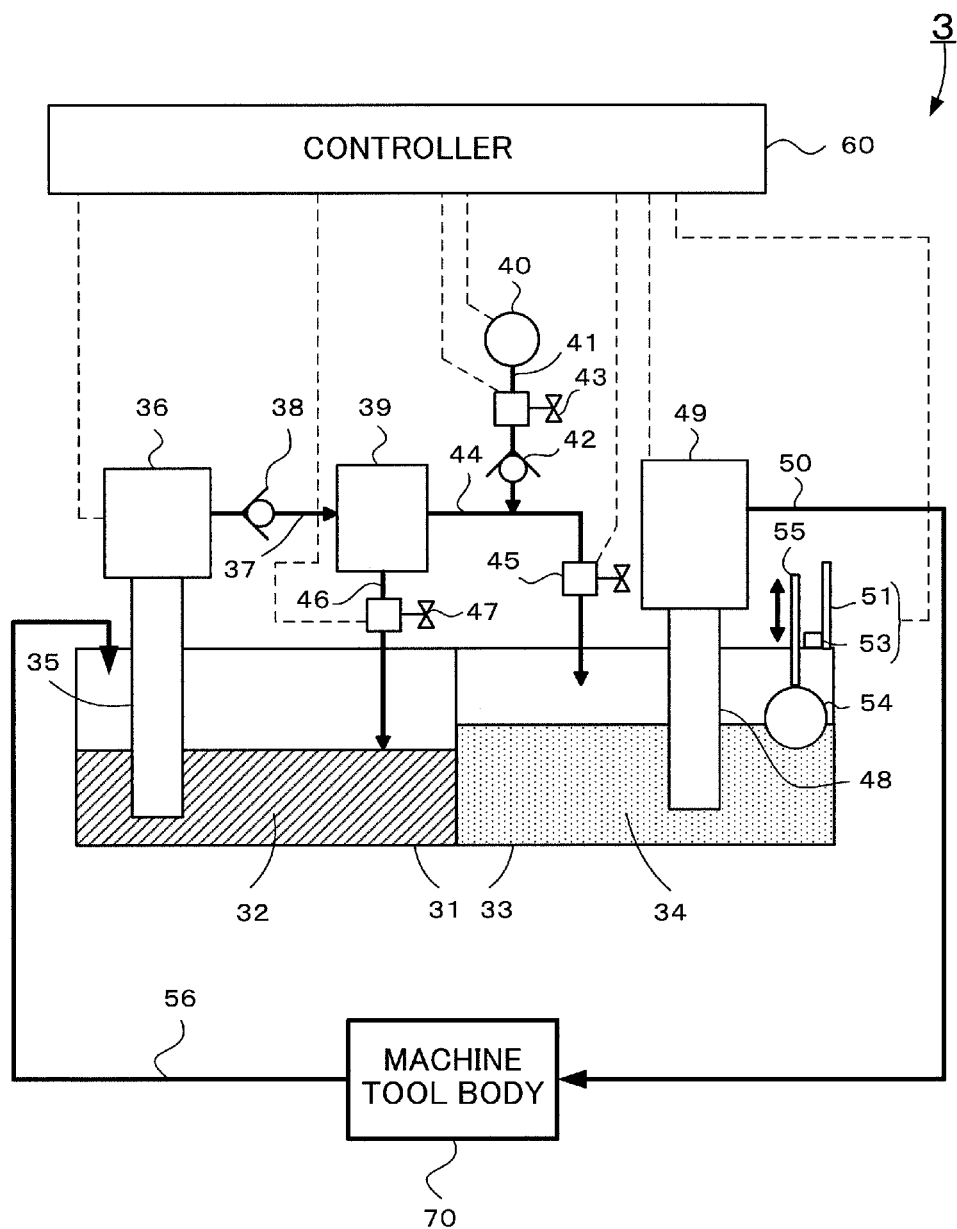
FIG. 2 is a diagram illustrating a cutting fluid filtration device according to a third or fifth embodiment of the invention.

A cutting fluid filtration device according to a third embodiment of the present invention will be described with reference to FIG. 2.

The configuration of the cutting fluid filtration device of the third embodiment is the same as those of the cutting fluid filtration devices of the first and second embodiments except for a sensor provided in the clean fluid tank 33. More specifically, in the first embodiment, as shown in FIG. 1, the two sensors, the upper- and lower-limit detection proximity sensors 52 and 53, are provided for use in the clean fluid tank 33. The third embodiment differs from the first embodiment in that it uses only a single sensor, a lower-limit detection proximity sensor 53.

In the second embodiment, the operating time of the filter pump 36 is regarded as a period from the time when the lower-limit detection proximity sensor 53 is turned off until the upper-limit detection proximity sensor 52 is turned on. In the third embodiment, in contrast, a filter pump 36 is controlled so that it stops in a preset pump operation reference time A after the lower-limit detection proximity sensor 53 is turned off. The pump operation reference time A is set to a time in which the liquid level of a cutting fluid raised from a lower-limit position substantially reaches an upper-limit position. This embodiment is configured so that the cutting fluid overflows from a clean fluid tank into a contaminated fluid tank if the upper-limit position in the clean fluid tank is reached in a time shorter than the pump operation reference time A. Thus, no such problem occurs that the cutting fluid spills out of the tank.

Figure 5B:
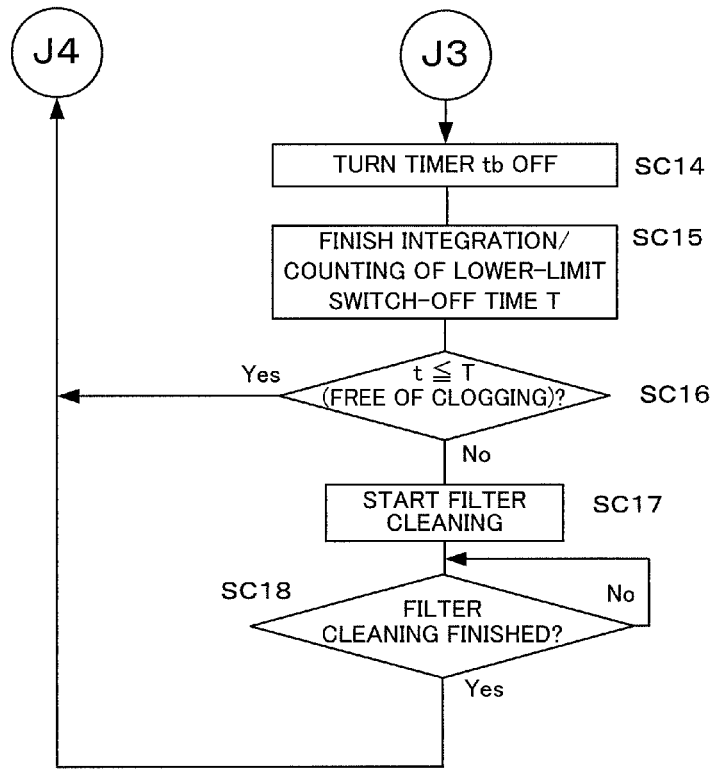

FIGS. 5A and 5B are flowcharts illustrating a method of determining clogging of a filter by the cutting fluid filtration device according to the third embodiment of the present invention. The following is a sequential description of various steps of operation.

(Step SC1) The preset pump operation reference time A and a preset predetermined time B are read.

(Step SC2) A preset reference time T is read.

(Step SC3) A timer tb for measuring a filter clogging determination time and a timer ta for measuring the pump operating time are reset.

(Step SC4) Lower-limit switch-off time t for integrating the time during which the lower-limit detection proximity sensor 53 of the clean fluid tank is off is set to "0" (or initialized).

(Step SC5) The timer tb is turned on.

(Step SC6) It is determined whether the lower-limit detection proximity sensor 53 is off or not. If the proximity sensor 53 is off (Yes), that is, if the liquid level of the clean fluid tank is lower than a lower-limit value, the program proceeds to Step SC7. If the proximity sensor 53 is on (No), that is, if the liquid level is not lower than the lower-limit value, in contrast, the program proceeds to Step SC9.

(Step SC7) It is determined whether the filter pump 36 is running or not. If the pump 36 is running, the program proceeds to Step SC9. If not (No), the program proceeds to Step SC8.

(Step SC8) The filter pump 36 and the timer ta for measuring the pump operating time are started.

(Step SC9) It is determined whether the lower-limit detection proximity sensor 53 is off or not. If the proximity sensor 53 is off (Yes), that is, if the liquid level of the clean fluid tank is lower than the lower-limit value, the program proceeds to Step SC10. If the proximity sensor 53 is on (No), that is, if the liquid level is equal to or higher than the lower-limit value, in contrast, the program proceeds to Step SC11.

(Step SC10) Time $\Delta t$ during which the lower-limit detection proximity sensor 53 is off is added to lower-limit switch-off time t to update the lower-limit switch-off time t ($t=t+\Delta t$).

(Step SC11) It is determined whether the time measured by the timer ta is equal to or higher than the pump operation reference time A. If the time measured by the timer ta is not shorter than the pump operation reference time A (Yes), the program proceeds to Step SC12. If the pump operation reference time A is not yet reached (No), the program proceeds to Step SC13.

(Step SC12) The filter pump 36 is stopped, whereupon the program proceeds to Step SC13.

(Step SC13) It is determined whether or not the predetermined time B read in Step SC1 is reached by the time measured by the timer tb, that is, whether or not the time measured by the timer tb B. If the predetermined time B is reached by the time measured by the timer tb (Yes), the program proceeds to Step SC14. If not (NO), the program returns to Step SC6.

(Step SC14) The timer tb is turned off.

(Step SC15) Integration of lower-limit switch-off time t is finished.

(Step SC16) It is determined whether or not lower-limit switch-off time t updated in Step SC10 is equal to or shorter than the reference time T read in Step SC2. If lower-limit switch-off time t is equal to or shorter than the reference time T (Yes), it is determined that the filter is not clogged, whereupon the program returns to Step SC1. If the reference time T is exceeded (NO), it is determined that the filter is clogged, whereupon the program proceeds to Step SC17.

(Step SC17) Filter cleaning is started.

(Step SC18) It is determined whether the filter cleaning is finished or not. If the cleaning is not yet finished (No), the process of Step SC18 is repeated until the cleaning is finished. If the cleaning is finished (Yes), it is determined that the filter cleaning is finished and therefore the clogging is removed, whereupon the program returns to Step SC1.

In this third embodiment, the pump driving time can be set at low cost by previously setting the predetermined pump operation reference time even in the case where a single liquid level sensor is used to detect the lower-limit position. Further, the state of change in the liquid level can be detected more accurately by integrating the time during which the lower-limit detection proximity sensor 53 is off and therefore clogging of the filter can be detected more accurately.

While this third embodiment is described as a modification of the second embodiment, it may alternatively be configured, as a modification of the first embodiment, so that whether or not the pump operation reference time A is exceeded is determined in place of whether or not an upper-limit switch of the clean fluid tank is turned off.

Fourth Embodiment

In determining clogging of a filter during backwashing, according to a fourth embodiment of the cutting fluid filtration device, the frequency at which a lower-limit detection proximity sensor 53 in an off-state is turned on within a preset predetermined time is counted. If the resulting count value is smaller than a reference frequency D, the filter is determined to be clogged. The liquid level position and the operation of the lower-limit detection proximity sensor 53 will first be described with reference to FIGS. 9 and 10.

Figure 9:
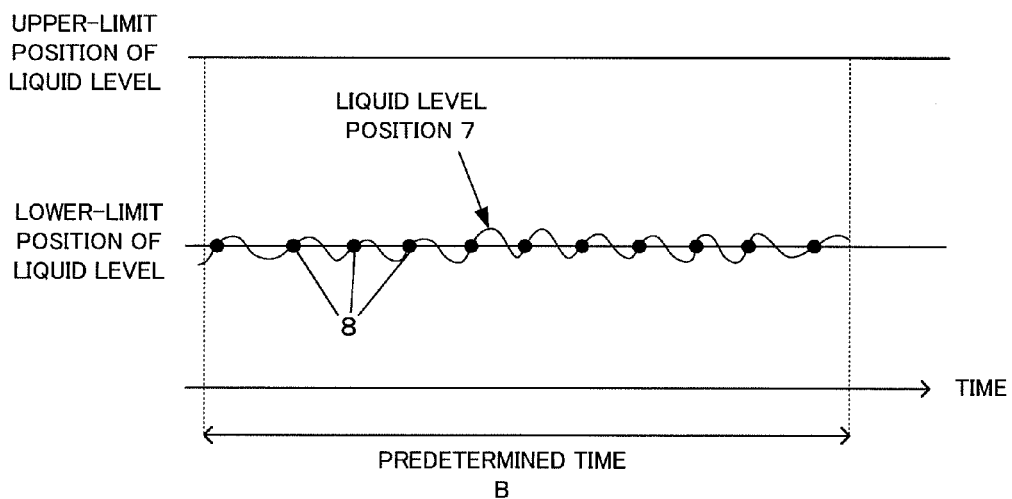
FIG. 9 is a diagram illustrating the relationship between the liquid level position and operation in the cutting fluid filtration device according to either the fourth or fifth embodiments.
Figure 10:
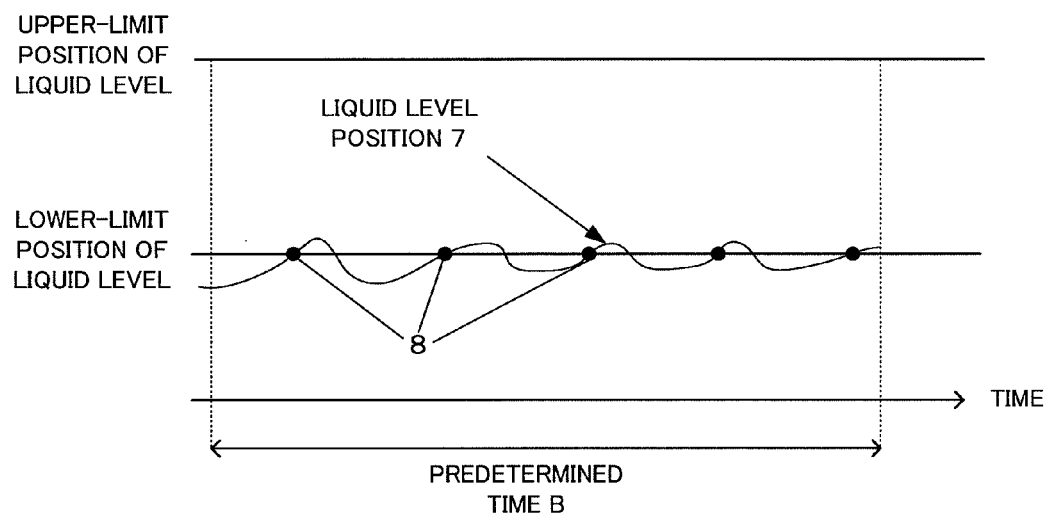
FIG. 10 is a diagram illustrating the relationship between the liquid level position and operation in the cutting fluid filtration device according to either the fourth or fifth embodiments.

In FIGS. 9 and 10, a curve 7 represents the liquid level position that varies with time. Black circles ("●") represent points in time when the lower-limit detection proximity sensor 53 in the off-state is turned on. FIG. 9 shows a case where the filter is not clogged, and FIG. 10 shows a case where the filter is clogged. As seen from comparison between FIGS. 9 and 10, the frequency at which the lower-limit detection proximity sensor 53 in the off-state is turned on within a predetermined time B is lower in the case of FIG. 10. This is presumably because the clogged filter increases the necessary time to raise the liquid level of the cutting fluid.

Figure 7A:
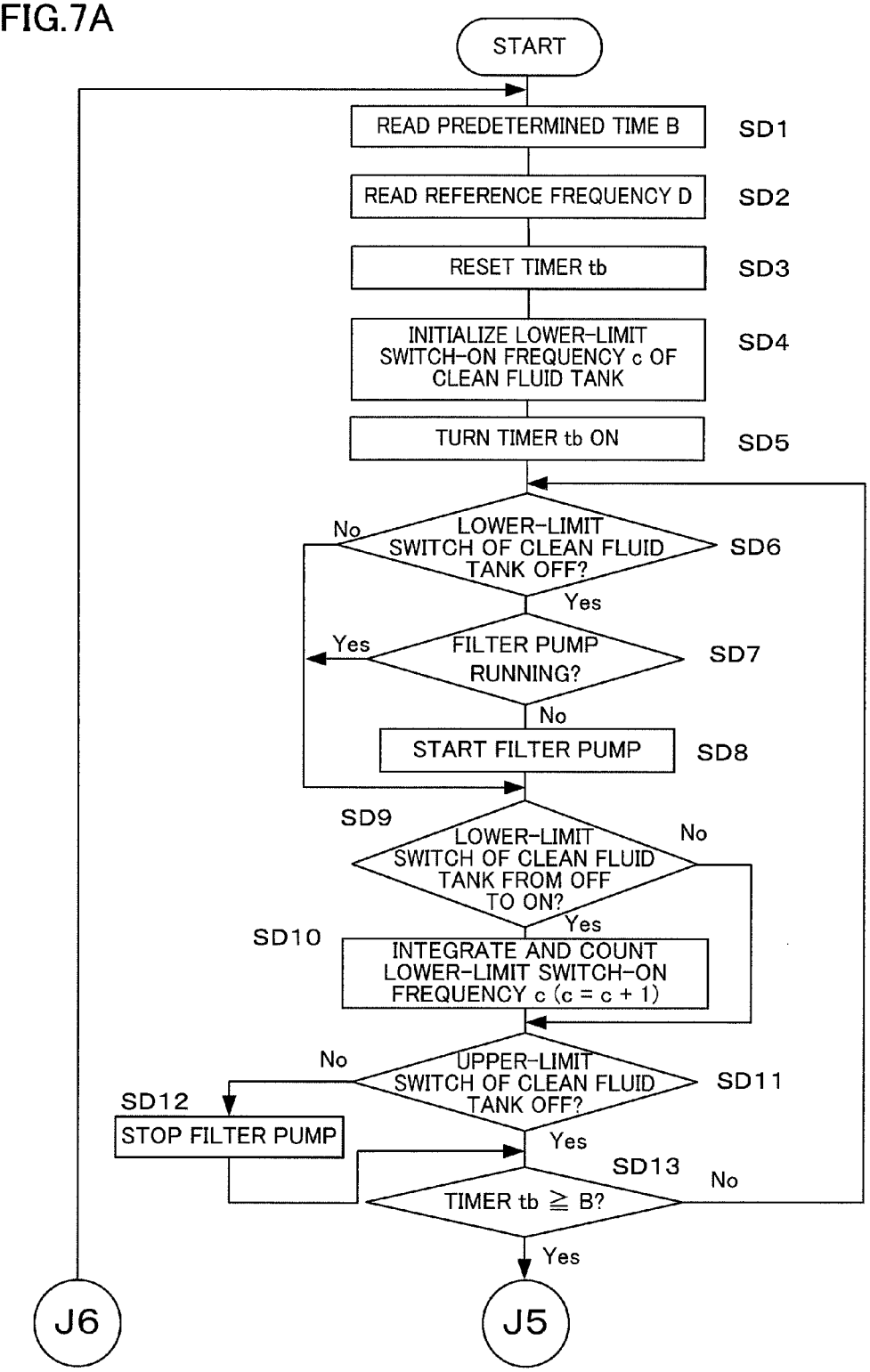
FIGS. 7A and 7B are flowcharts illustrating the operation of the cutting fluid filtration device according to the fourth embodiment.
Figure 7B:
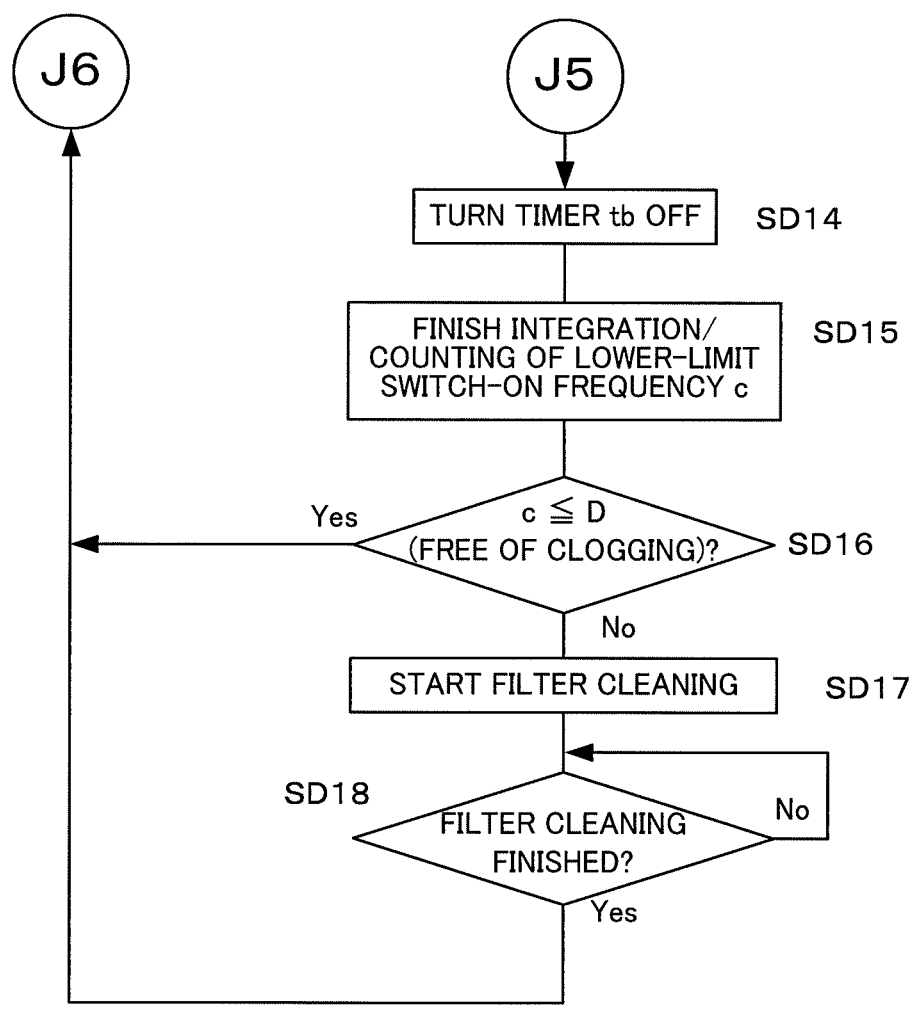

FIGS. 7A and 7B are flowcharts illustrating a method of determining clogging of a filter by the cutting fluid filtration device according to the fourth embodiment of the present invention. The following is a sequential description of various steps of operation.

(Step SD1) The predetermined time B is read.

(Step SD2) The preset reference frequency D is read.

(Step SD3) A timer tb for measuring a filter clogging determination time is reset.

(Step SD4) Lower-limit switch-on/off frequency c for integrating the frequency at which the lower-limit detection proximity sensor 53 of a clean fluid tank in the off-state is turned on is set to "0" (or initialized).

(Step SD5) The timer tb is turned on.

(Step SD6) It is determined whether the lower-limit detection proximity sensor 53 of the clean fluid tank is off or not. If the proximity sensor 53 is off (Yes), that is, if the liquid level of the clean fluid tank is lower than a lower-limit value, the program proceeds to Step SD7. If the proximity sensor 53 is on (No), that is, if the liquid level is not lower than the lower-limit value, in contrast, the program proceeds to Step SD9.

(Step SD7) It is determined whether a filter pump 36 is running or not. If the pump 36 is running, the program proceeds to Step SD9. If not (No), the program proceeds to Step SD8.

(Step SD8) The filter pump 36 is started.

(Step SD9) It is determined whether or not the lower-limit detection proximity sensor 53 in the off-state is turned on. If the proximity sensor 53 is turned on (Yes), the program proceeds to Step SD10. If the sensor 53 is not turned on (or kept off) (NO), the program proceeds to Step SD11.

(Step SD10) "1" is added to lower-limit switch-on/off frequency c to update the lower-limit switch-on/off frequency c (c=c+1).

(Step SD11) It is determined whether an upper-limit detection proximity sensor 52 is off or not. If the proximity sensor 52 is off (Yes), that is, if the liquid level of the clean fluid tank is lower than an upper-limit value, the program proceeds to Step SD13. If the proximity sensor 52 is on (No), that is, if the liquid level is not lower than the upper-limit value, in contrast, the program proceeds to Step SD12.

(Step SD12) The filter pump 36 is stopped, whereupon the program proceeds to Step SD13.

(Step SD13) It is determined whether or not the predetermined time B is reached by the time measured by the timer tb for measuring the filter clogging determination time, that is, whether or not the time measured by the timer tb≥B. If the predetermined time B is reached by the time measured by the timer tb (Yes), the program proceeds to Step SD14. If not (No), the program returns to Step SD6.

(Step SD14) The timer tb for measuring the filter clogging determination time is turned off.

(Step SD15) Counting of frequency c at which the lower-limit detection proximity sensor 53 in the off-state is turned on is finished.

(Step SD16) It is determined whether (current) lower-limit switch-on/off frequency c updated in Step SD10 is not lower than the reference frequency D read in Step SD2. If lower-limit switch-on/off frequency c is not lower than the reference frequency D (Yes), that is, if the filter is not clogged, the program returns to Step SD1. If frequency c is lower than the reference frequency D (No), that is, if the filter is clogged, in contrast, the program proceeds to Step SD17.

(Step SD17) Filter cleaning is started.

(Step SD18) It is determined whether the filter cleaning is finished or not. If the cleaning is not yet finished (No), the process of Step SD18 is repeated until the cleaning is finished. If the cleaning is finished (Yes), it is determined that the filter cleaning is finished and therefore the clogging is removed, whereupon the program returns to Step SD1.

In the fourth embodiment of the cutting fluid filtration device described above, the state of change in the liquid level can be detected more accurately by integrating the frequency at which a lower-limit switch of the clean fluid tank in the off-state is turned on and therefore clogging of the filter can be detected more accurately. Further, clogging of the filter can be quickly detected by counting the frequency at which the lower-limit switch in the off-state is turned on within the predetermined time B.

Fifth Embodiment

In the fourth embodiment described above, the operating time of the filter pump 36 is regarded as a period from the time when the lower-limit detection proximity sensor 53 is turned off until the time when the upper-limit detection proximity sensor 52 is turned on. In the fifth embodiment, in contrast, a filter pump 36 is controlled so that it stops in a preset pump operation reference time A after the lower-limit detection proximity sensor 53 is turned off. The pump operation reference time A is set approximately to a time during which the liquid level of a cutting fluid rises from a lower-limit position and then reaches an upper-limit position. This embodiment is configured so that the cutting fluid overflows from a clean fluid tank into a contaminated fluid tank if the upper-limit position in the clean fluid tank is reached by the liquid level in a time shorter than the pump operation reference time A. Thus, no such problem occurs that the cutting fluid spills out of the tank.

Figure 8A:
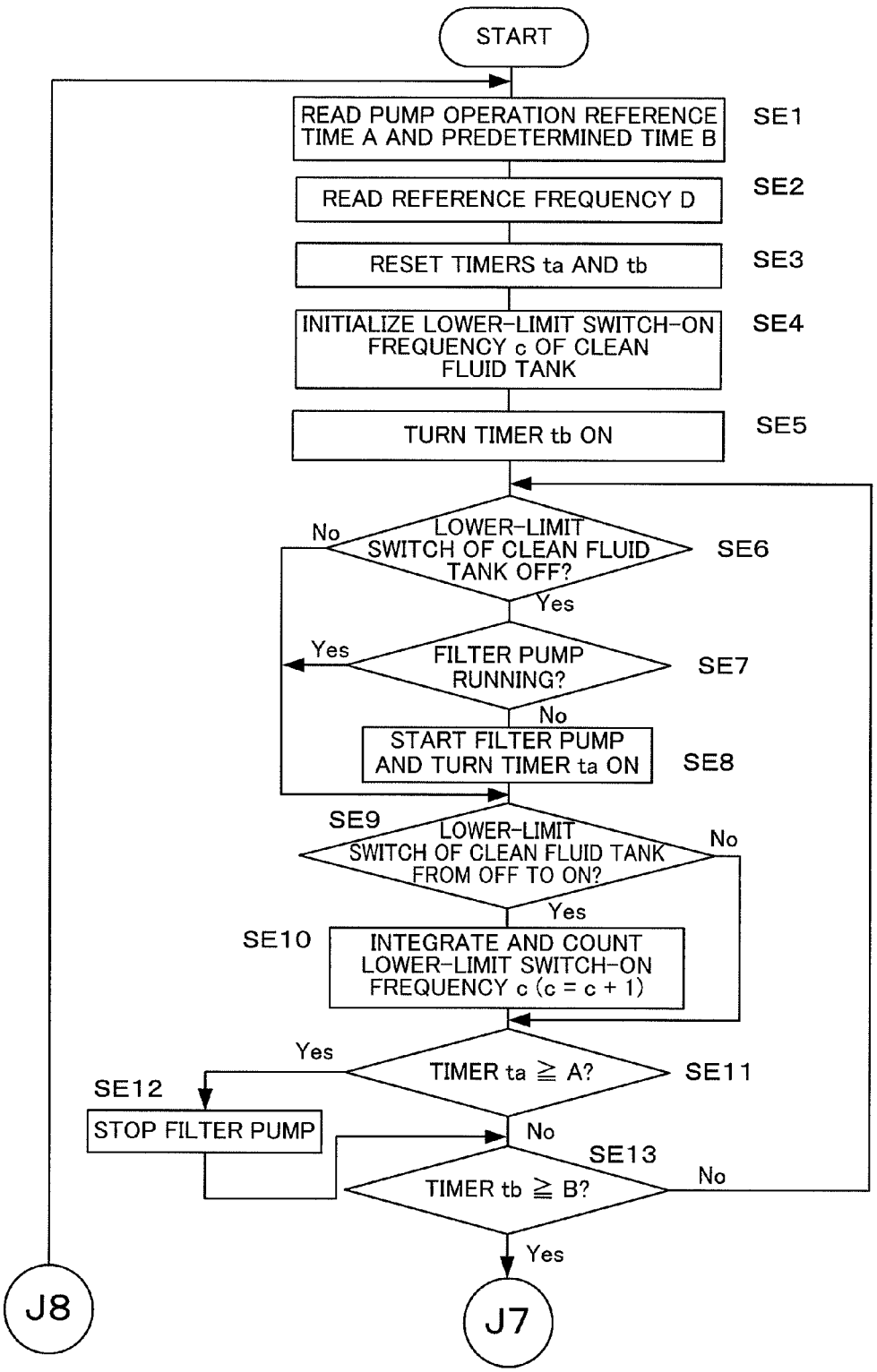
FIGS. 8A and 8B are flowcharts illustrating the operation of the cutting fluid filtration device according to the fifth embodiment.
Figure 8B:
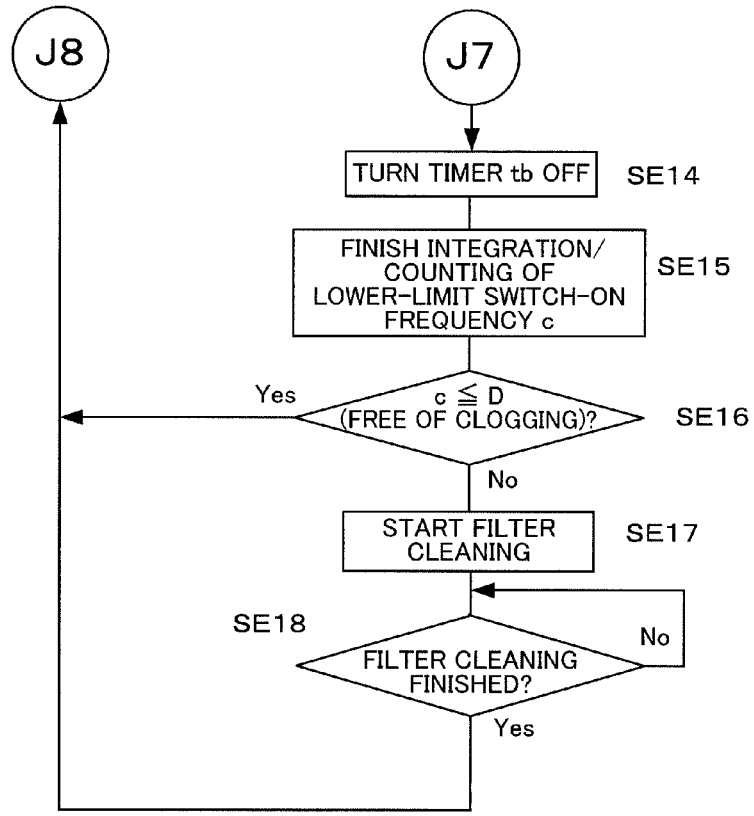

FIGS. 8A and 8B are flowcharts illustrating a method of determining clogging of a filter by the cutting fluid filtration device according to the fifth embodiment of the present invention.

The following is a sequential description of various steps of operation.

(Step SE1) A preset predetermined time B and the preset pump operation reference time A are read.

(Step SE2) A preset reference frequency D is read.

(Step SE3) A timer tb for measuring a filter clogging determination time and a timer to for measuring the pump operating time are reset.

(Step SE4) Lower-limit switch-on/off frequency c for integrating the frequency at which the lower-limit detection proximity sensor 53 of the clean fluid tank in an off-state is turned on is set to "0" (or initialized).

(Step SE5) The timer tb is turned on.

(Step SE6) It is determined whether the lower-limit detection proximity sensor 53 of the clean fluid tank is off or not. If the proximity sensor 53 is off (Yes), that is, if the liquid level of the clean fluid tank is lower than a lower-limit value, the program proceeds to Step SE7. If the proximity sensor 53 is on (No), that is, if the liquid level is not lower than the lower-limit value, in contrast, the program proceeds to Step SE9.

(Step SE7) It is determined whether a filter pump 36 is running or not. If the pump 36 is running, the program proceeds to Step SE9. If not (No), the program proceeds to Step SE8.

(Step SE8) The filter pump 36 is started and the timer ta is turned on.

(Step SE9) It is determined whether or not the lower-limit detection proximity sensor 53 in the off-state is turned on. If the proximity sensor 53 is turned on (Yes), the program proceeds to Step SE10. If the sensor 53 is not turned on (or kept off) (NO), the program proceeds to Step SE11.

(Step SE10) "1" is added to lower-limit switch-on/off frequency c to update the lower-limit switch-on/off frequency c (c=c+1).

(Step SE11) It is determined whether or not the time measured by the timer ta is equal to or longer than the pump operation reference time A read in Step SE1. If the time measured by the timer ta is equal to or longer than the pump operation reference time A (Yes), the program proceeds to Step SE12. If the pump operation reference time A is not yet reached (No), the program proceeds to Step SE13.

(Step SE12) The filter pump 36 is stopped, whereupon the program proceeds to Step SE13.

(Step SE13) It is determined whether or not the predetermined time B read in Step SE1 is reached by the time measured by the timer tb, that is, whether or not the time measured by the timer tb B. If the predetermined time B is reached by the time measured by the timer tb (Yes), the program proceeds to Step SE14. If not (No), the program returns to Step SE6.

(Step SE14) The timer tb is turned off.

(Step SE15) Counting of lower-limit switch-on/off frequency c is finished.

(Step SE16) It is determined whether lower-limit switch-on/off frequency c is equal to or higher than the reference frequency D read in Step SE2. If lower-limit switch-on/off frequency c is equal to or higher than the reference frequency D (Yes), that is, if the filter is not clogged, the program returns to Step SE1. If frequency c is lower than the reference frequency D (No), that is, if the filter is clogged, in contrast, the program proceeds to Step SE17.

(Step SE17) Filter cleaning is started.

(Step SE18) It is determined whether the filter cleaning is finished or not. If the cleaning is not yet finished (No), the process of Step SE18 is repeated until the cleaning is finished. If the cleaning is finished (Yes), it is determined that the filter cleaning is finished and therefore the clogging is removed, whereupon the program returns to Step SE1.

In the fifth embodiment of the cutting fluid filtration device described above, the pump driving time can be set at low cost by previously setting the predetermined pump operation reference time even in the case where a single liquid level sensor is used to detect the lower-limit position. Further, the state of change in the liquid level can be detected more accurately by integrating the frequency at which the lower-limit detection proximity sensor 53 in the off-state is turned on and therefore clogging of the filter can be detected more accurately.

Sixth Embodiment

Figure 11:
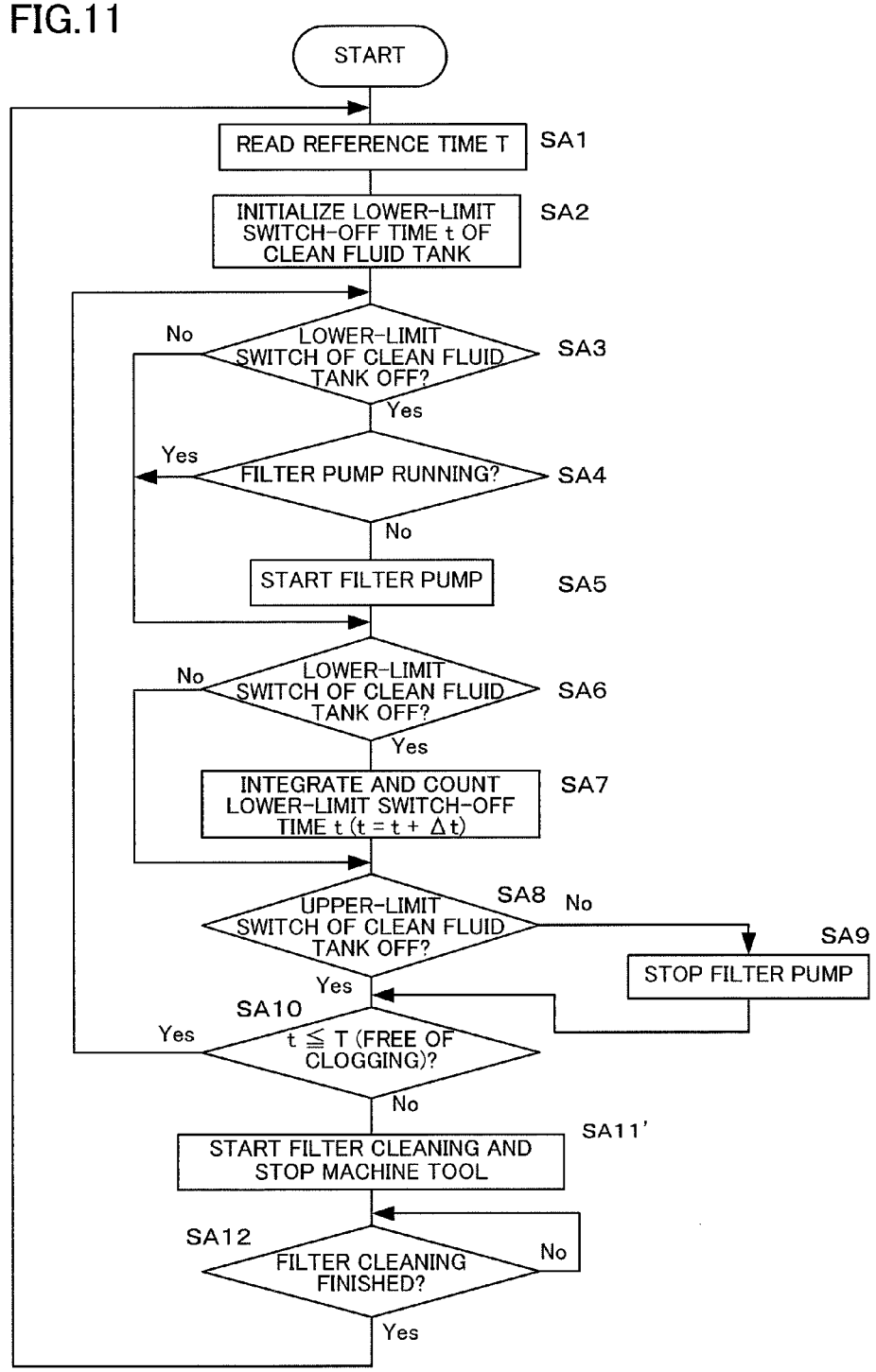
FIG. 11 is a flowchart illustrating the operation of a cutting fluid filtration device according to a sixth embodiment of the invention.

FIG. 11 is a flowchart illustrating a method of determining clogging of a filter by a cutting fluid filtration device according to a sixth embodiment. This sixth embodiment differs from the first embodiment only in that the operation of a machine tool is stopped the moment filter cleaning is started (Step SA11'), instead of starting the filter cleaning in Step SA11 of the flowchart of FIG. 3 (first embodiment).

In the sixth embodiment of the cutting fluid filtration device, the filter cleaning is started and the machine tool is stopped if it is determined by a clogging determination unit that the filer is clogged. Thus, if the filter is clogged so that a cutting fluid cannot be appropriately supplied, the machine tool can be stopped to prevent production of defectives and its failure.

Figure 4B:
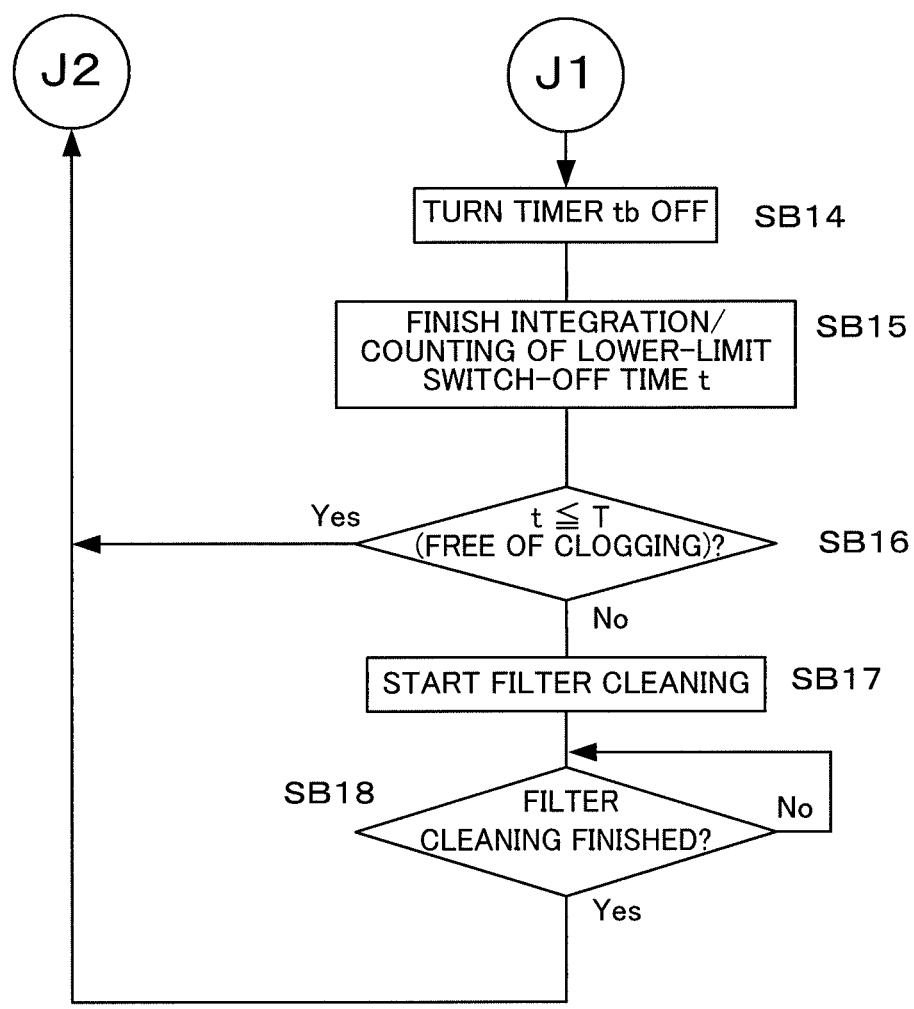

The sixth embodiment is configured so that the operation of the machine tool is stopped in Step SA11' corresponding to Step SA11 in the flowchart of FIG. 3 showing the first embodiment. In other embodiments described above, moreover, the operation of the machine tool may be stopped in a step corresponding to Step SB17 in FIG. 4B showing the second embodiment, Step SC17 in FIG. 5B (third embodiment), Step SD17 in FIG. 7B (fourth embodiment), or Step SE17 in FIG. 8B (fifth embodiment).

Seventh Embodiment

Figure 12:
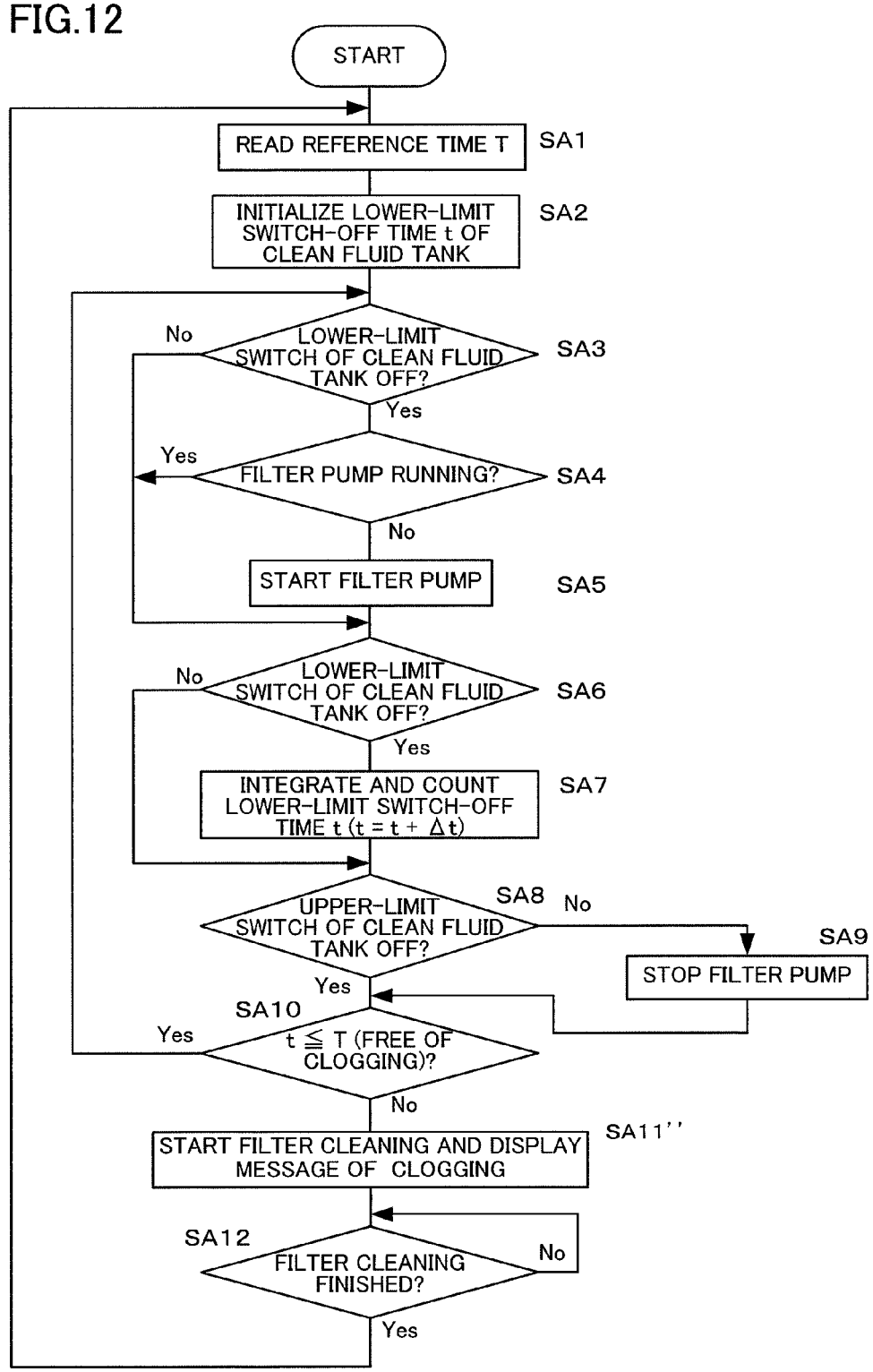
FIG. 12 is a flowchart illustrating the operation of a cutting fluid filtration device according to a seventh embodiment of the invention.
Figure 13:
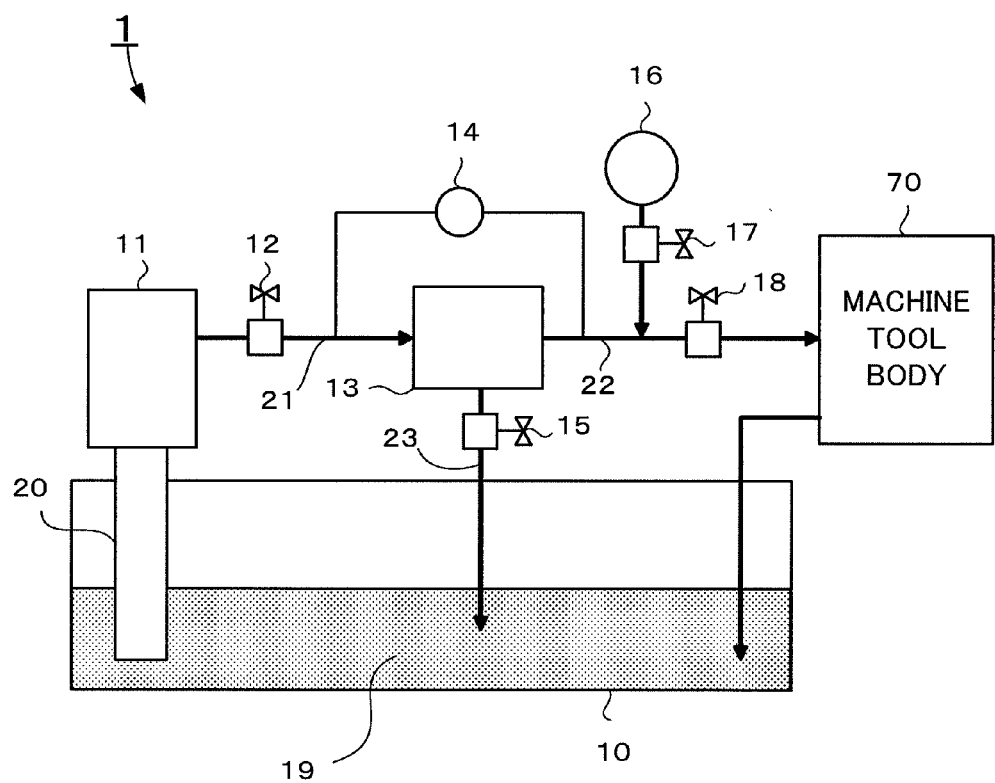
FIG. 13 is a diagram illustrating the operation of a conventional cutting fluid filtration device.

FIG. 12 is a flowchart illustrating a method of determining clogging of a filter by a cutting fluid filtration device according to a seventh embodiment. This seventh embodiment differs from the first embodiment only in that a message to the effect that a filter is clogged is displayed the moment filter cleaning is started (Step SA11"), instead of starting the filter cleaning in Step SA11 of the flowchart of FIG. 3 (first embodiment).

In the seventh embodiment of the cutting fluid filtration device, the message to the effect that the filter is clogged is displayed when the filter is determined to be clogged by clogging determination means. Thus, a user can be appropriately informed of the clogging of the filter.

Although the message for the occurrence of clogging is displayed as an information method according to the second embodiment, the information method is not limited to message display and may alternatively be sound alarming or the like.

The seventh embodiment is configured so that the operation of the machine tool is stopped in Step SA11" corresponding to Step SA11 in the flowchart of FIG. 3 showing the first embodiment. In other embodiments described above, moreover, the message to the effect that the filter is clogged may be displayed in a step corresponding to Step SB17 in FIG. 4B showing the second embodiment, Step SC17 in FIG. 5B (third embodiment), Step SD17 in FIG. 7B (fourth embodiment), or Step SE17 in FIG. 8B (fifth embodiment). Further, both the sixth and seventh embodiments may be adopted so that information can be given by informing means after the operation of the machine tool is stopped in starting the filter cleaning.

While compressed air from the air source is used for cleaning in the first half of a backwashing period in these embodiments, a liquid may be used in place of compressed air for backwashing.

In the embodiments described above, moreover, the proximity sensors are used to detect the liquid level of the clean fluid tank. However, the sensors are not limited to proximity sensors and may be of other types provided that they can appropriately detect the liquid level. While the sensors are attached to the clean fluid tank in these embodiments, moreover, they may alternatively be attached to the contaminated fluid tank.

In the embodiments described above, furthermore, whether or not to clean the filter is only determined by whether or not the reference time is exceeded by the integrated lower-limit switch-off time. In other embodiments described above, moreover, a plurality of reference times may be set so that the level of the backwashing, based on the compressed air pressure during the operation, operating time, etc., can be changed depending on the degree of clogging of the filter determined by that one of the reference times which is exceeded by the integrated lower-limit switch-off time. Further, the sensors for detecting the liquid level may be configured to be turned on and off in a contrary manner.

The invention claimed is:

1. A machine tool with a cutting fluid filtration device, the cutting fluid filtration device comprising:
   a contaminated fluid tank which stores a cutting fluid that has been used in machining a workpiece;
   a pump which supplies the cutting fluid in the contaminated fluid tank to a filter configured to filter impurities contained in the cutting fluid;
   a clean fluid tank which stores the cutting fluid filtered by the filter;
   a lower-limit-position liquid level detector configured to detect a liquid level which requires supply of the cutting fluid from the contaminated fluid tank to the clean fluid tank;
   a pump control unit configured to drive the pump when the lower-limit-position liquid level detector detects that the liquid level of the cutting fluid is lowered below a preset lower-limit position;
   a time integration unit configured to integrate the time during which the liquid level of the cutting fluid is below the lower-limit position; and
   a clogging determination unit configured to determine that the filter is clogged when a preset reference time is exceeded by the time integrated by the time integration unit.

2. The machine tool with a cutting fluid filtration device according to claim 1, wherein the clogging determination unit determines that the filter is clogged when the preset reference time is exceeded by the time integrated by the time integration unit within a preset predetermined time.

3. The machine tool with a cutting fluid filtration device according to claim 2, wherein the predetermined time is variable.

4. The machine tool with a cutting fluid filtration device according to claim 1, wherein
   the cutting fluid filtration device further comprises an upper-limit-position liquid level detector configured to detect an upper-limit position of the liquid level of the cutting fluid in the clean fluid tank, and
   the pump control unit is configured to drive the pump when the liquid level of the cutting fluid falls below the lower-limit position and to stop the pump when the liquid level reaches the upper-limit position.

5. The machine tool with a cutting fluid filtration device according to claim 1, wherein the pump control unit is configured to drive the pump when the liquid level of the cutting fluid in the clean fluid tank falls below the lower-limit position and to stop the pump when a preset pump operation reference time has elapsed.

6. The machine tool with a cutting fluid filtration device according to claim 5, wherein the pump operation reference time is variable.

7. The machine tool with a cutting fluid filtration device according to claim 1, wherein the machine tool is stopped when it is determined by the clogging determination unit that the filter is clogged.

8. The machine tool with a cutting fluid filtration device according to claim 1, comprising informing means for informing that the filter is clogged if it is determined by the clogging determination unit that the filter is clogged.

9. The machine tool with a cutting fluid filtration device according to claim 1, wherein the reference time is variable.

* * * * *